(No Model.)

A. A. SMITH.
VEHICLE SPRING.

No. 582,555.  Patented May 11, 1897.

Witnesses:
J. M. Fowler Jr.
A. G. Heylman

Inventor:
Andrew A. Smith
by Geo. H. Evans
Attorneys.

UNITED STATES PATENT OFFICE.

ANDREW A. SMITH, OF HOTCHKISS, COLORADO.

VEHICLE-SPRING.

SPECIFICATION forming part of Letters Patent No. 582,555, dated May 11, 1897.

Application filed July 3, 1896. Serial No. 598,006. (No model.)

*To all whom it may concern:*

Be it known that I, ANDREW A. SMITH, a citizen of the United States, residing at Hotchkiss, Delta county, Colorado, have invented certain new and useful Improvements in Vehicle or Box Springs, of which the following is a full, clear, and exact description, reference being had to the accompanying drawings, in which—

Figure 1:
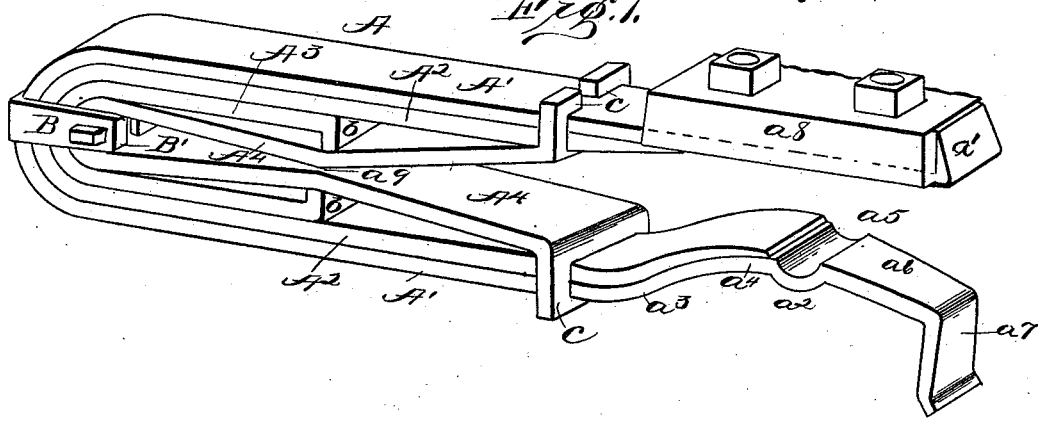
Figure 2:
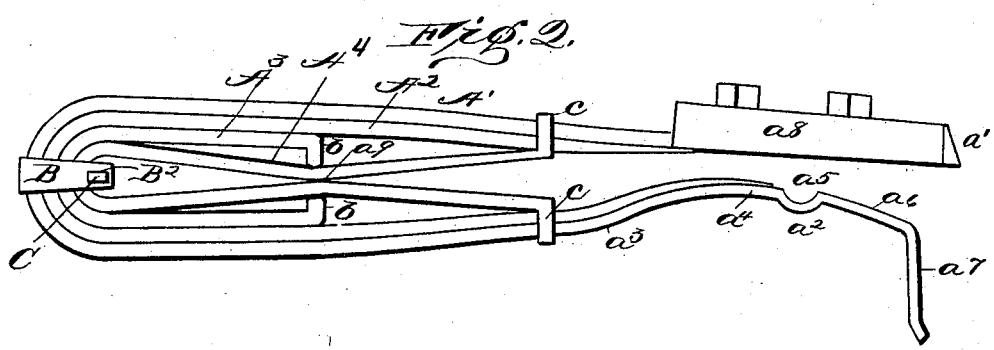
Figure 3:
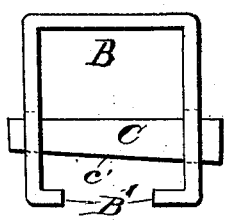

Figure 1 is a perspective of the spring in its normal position. Fig. 2 is a side elevation showing the spring compressed. Fig. 3 is a detail view of the clip and wedge or key for holding the several members of the spring together.

My invention relates to a vehicle or box spring of the class which are U-shaped.

The object of the invention is to greatly increase the weight-bearing capacity of the spring without increasing the cost.

The invention will be hereinafter fully described, and pointed out in the claims.

In the drawings, A represents the improved spring as a whole.

A' is the outer horizontally-extending U-shaped member, having an upturned lip $a'$ at the extremity of its upper arm and a hook-like offset $a^2$ at the extremity of its lower arm. This hook is formed by the upward bend $a^3$, merging into a horizontal portion $a^4$, the depressed portion $a^5$, downwardly-inclined portion $a^6$, and depending lip $a^7$, these parts being in rear of the upper lip $a'$ and adapted to engage and be secured to a bolster or other part, while lip $a'$ engages a cross-piece $a^8$ on the under side of the body or other part to be supported.

$A^2$ is the first inner member of the spring, shaped to fit closely within the outer member A', with the extremity of its lower arm curved upwardly and forwardly to overlie the parts $a^3 a^4$ of the hook $a^2$, the upper arm of the spring member $A^2$ terminating just under the bar $a^8$, to which the upper arm of the outer U-shaped member A' is bolted.

$A^3$ is a short U-shaped member fitting snugly within the member $A^2$ and having its ends inturned to form the alined posts $b\ b$, the adjacent ends of which are spaced apart.

$A^4$ is the innermost spring member, snugly fitting within the bow of the member $A^3$ and having its two arms brought toward each other or converged between their ends, as at $a^9$, but spaced apart, while the diverging ends of said member $A^4$ are forked or looped, as at $c\ c$, to embrace the members A' $A^2$ of the spring. The posts $b\ b$ rest against the concave portions of the member $A^4$, as clearly shown in the drawings, and space said spring at these points away from the member $A^2$.

B is a rectangular clip embracing the bowed portions of the several members A' $A^2$ $A^3$ $A^4$ and provided with longitudinal slots $B^2$ in its sides, the ends of the sides being inturned, as shown at B'.

C is a wedge-shaped key driven into place through the slots $B^2$, so that the front inclined edge $c'$ will engage the front ends of the slots and force the key firmly against the inner side of spring member $A^4$, and thus bind all of the members together. The smaller end of the key may then be bent or upset to hold the key in place.

When the spring carries an ordinary load, the converging portions $a^9$ of the member $A^4$ will not touch, and the full length of the spring will be brought into play, as only a light spring is then desired, but when a heavy load is carried by the spring the posts $b\ b$ will be forced toward each other and the converging points $a^9$ of the inner member $A^4$ will contact. Thus the fulcrum of the spring will be transferred from the bow to the posts $b\ b$ and parts $a^9$, which will, of course, shorten and stiffen the action of the spring. The full force of the spring member $A^4$ from $a^9$ to $c$ will be brought into action at this time and act as a short V-shaped spring to brace and stiffen the members A' $A^2$ from the posts $b\ b$ to their extremities.

The convexity formed by the depression $a^5$ rests and rocks on the bolster when the spring is secured in place.

If any member of the spring should break, a new one may easily be inserted by simply removing the key C and the clip B, as there are no nuts or bolts to remove.

What I claim is—

1. A U-shaped spring comprising a series of nesting members united at the bowed portions; the two arms of the innermost member being bowed or inclined toward each other between their ends, substantially as described.

2. A U-shaped spring, comprising a series of nesting members united at the bowed portions; the two arms of the innermost member being bowed or inclined toward each other between their ends, and spaced from the next member by intervening posts or bearings, substantially as described.

3. A U-shaped spring, comprising a series of nesting members united at the bowed portions, one of the innermost members being shorter than the others and having inturned ends spaced apart and forming posts or bearings, and the innermost spring member having its two arms bowed or inclined toward each other between their ends and crossing said posts at said concaved portions, substantially as described.

4. A U-shaped spring, comprising a series of nesting members united at their bowed portions; one of the inner members being shorter than the others, and having inturned ends, spaced apart and forming posts or bearings, and the innermost spring member having its two arms curved or inclined toward each other between their ends where they cross the posts and having forks or loops at the outer extremities embracing the outer spring members, substantially as described.

5. A U-shaped spring comprising a series of nesting members, the outermost member of which terminates at its ends in attaching devices whereby it may be secured in place and the two arms of the innermost member being provided with opposed, inwardly-projecting portions, normally out of contact but thrown into contact when the spring is under heavy tension, an open clip embracing the bowed portions of the members and provided with slotted sides, and a wedge driven through the slots with its straight edge engaging the innermost member of the spring, substantially as set forth.

6. The herein-described U-shaped spring, one arm or member of which terminates in an upturned lip $a'$; the other shorter member of the spring terminating in a downwardly-opening hook $a^2$, shaped substantially as shown and described.

7. A U-shaped spring consisting in the nesting members $A'$, $A^2$, $A^3$, $A^4$, clipped together at their bowed portions; the short member $A^2$ having its ends bent toward each other as at $b, b$, and the member $A^4$ having its two arms bowed or inclined inwardly toward each other as at $a^9$ and bearing on said posts, loops or forks $c$, at the diverging extremities of the member $A^4$; the outer member $A'$ terminating in the lip $a'$, and the hook $a^2$, substantially as described.

8. A U-shaped spring comprising a series of nesting members; the outer member of which has an upturned end or lip at the free extremity of its upper arm, and a downwardly-opening inwardly-offset hook at the extremity of its lower arm; the horizontally-extended portion of the hook having a convexity on its under side to rock on the bolster, substantially as described.

ANDREW A. SMITH.

Witnesses:
NEWTON M. HIESTAND,
G. W. HENDRICKS.